(12) United States Patent
Jiang et al.

(10) Patent No.: US 10,375,383 B2
(45) Date of Patent: Aug. 6, 2019

(54) METHOD AND APPARATUS FOR ADJUSTING INSTALLATION FLATNESS OF LENS IN REAL TIME

(71) Applicant: SZ DJI TECHNOLOGY CO., LTD., Shenzhen (CN)

(72) Inventors: Caigao Jiang, Hong Kong (CN); Zisheng Cao, Shenzhen (CN); Mingyu Wang, Shenzhen (CN); Taiwen Liang, Shenzhen (CN); Xiaozheng Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 74 days.

(21) Appl. No.: 15/304,439

(22) PCT Filed: Apr. 17, 2014

(86) PCT No.: PCT/CN2014/075582
§ 371 (c)(1),
(2) Date: Oct. 14, 2016

(87) PCT Pub. No.: WO2015/157962
PCT Pub. Date: Oct. 22, 2015

(65) Prior Publication Data
US 2017/0048518 A1    Feb. 16, 2017

(51) Int. Cl.
*H04N 17/00* (2006.01)
*G03B 43/00* (2006.01)
(Continued)

(52) U.S. Cl.
CPC ........... *H04N 17/002* (2013.01); *G02B 27/62* (2013.01); *G03B 43/00* (2013.01); *H04N 5/2254* (2013.01)

(58) Field of Classification Search
CPC .... H04N 17/002; H04N 5/2254; G02B 27/62; G03B 43/00
(Continued)

(56) References Cited

U.S. PATENT DOCUMENTS 7,609,372 B1 * 10/2009 Tsai .................. G01M 11/0214
250/201.2
8,818,130 B2 * 8/2014 Morgan-Mar ....... G06K 9/3216
348/187
(Continued)

FOREIGN PATENT DOCUMENTS

CN    1796987    7/2006
CN    1831626    9/2006
(Continued)

OTHER PUBLICATIONS

International Search Report dated Jul. 8, 2014, issued by the State Intellectual Property Office of the P.R. China in counterpart International Application No. PCT/CN2014/075582; 5 pages.
(Continued)

*Primary Examiner* — Michael Lee
(74) *Attorney, Agent, or Firm* — Finnegan, Henderson, Farabow, Garrett & Dunner, L.L.P.

(57) ABSTRACT

A method and an apparatus for adjusting installation flatness of a lens in real time are provided. The method comprises: acquiring an image captured by a camera in real time, where the image comprises at least two groups of testing charts regarding different positions; pre-processing the image to obtain each group of testing charts by separation; calculating and displaying, based on each group of testing charts, a real-time resolution value of a camera photosensitive surface to each group of testing charts in real time; and adjusting the installation angle of the optical axis of the camera lens relative to the camera photosensitive surface in real time
(Continued)

based on the real-time resolution value of the camera photosensitive surface to each group of testing charts.

20 Claims, 9 Drawing Sheets

(51) Int. Cl.
*G02B 27/62* (2006.01)
*H04N 5/225* (2006.01)

(58) Field of Classification Search
USPC .......................................................... 348/188
See application file for complete search history.

(56) References Cited

U.S. PATENT DOCUMENTS

| | | | | |
|---|---|---|---|---|
| 2002/0080242 A1* | 6/2002 | Takahashi | ............... | H04N 5/217 348/207.99 |
| 2008/0288214 A1* | 11/2008 | Wu | ......................... | G03B 17/00 702/186 |
| 2012/0002058 A1* | 1/2012 | Ning | ....................... | H04N 5/217 348/188 |
| 2012/0013760 A1* | 1/2012 | Parodi-Keravec | ........................... | G01M 11/0264 348/222.1 |
| 2012/0050543 A1* | 3/2012 | Colla | ..................... | G03B 43/00 348/187 |
| 2013/0047396 A1* | 2/2013 | Au | ......................... | B23Q 17/22 29/407.09 |
| 2013/0299081 A1* | 11/2013 | Kim | ................... | H05K 13/0413 156/273.9 |
| 2016/0088266 A1* | 3/2016 | Du | ......................... | H04N 5/335 348/188 |
| 2016/0341974 A1* | 11/2016 | Kishine | .................. | G03B 43/00 |

FOREIGN PATENT DOCUMENTS

| | | |
|---|---|---|
| CN | 101489040 | 7/2009 |
| CN | 100592202 C | 2/2010 |
| CN | 101957553 | 1/2011 |
| CN | 102411256 | 4/2012 |
| CN | 102789111 | 11/2012 |
| CN | 102789111 A | 11/2012 |
| CN | 10-0896803 | 2/2013 |
| JP | 2006-30619 | 2/2006 |
| JP | 2006-078849 A | 3/2006 |
| JP | 2007-225768 A | 9/2007 |
| JP | 2008-170981 A | 7/2008 |
| JP | 2010-021985 A | 1/2010 |
| JP | 2010-256471 A | 11/2010 |
| JP | 2012-137751 A | 7/2012 |
| JP | 2013-198053 A | 9/2013 |
| KR | 10-0896803 | 5/2009 |

OTHER PUBLICATIONS

Office Action dated Mar. 16, 2016, in counterpart Chinese Application No. 201410155097.3: 11 pages.

* cited by examiner

METHOD AND APPARATUS FOR ADJUSTING INSTALLATION FLATNESS OF LENS IN REAL TIME

CROSS REFERENCE TO RELATED APPLICATIONS

This application is a national phase application of International Application No. PCT/CN2014/075582, filed Apr. 17, 2014, the content of which is incorporated herein by reference in its entirety.

FIELD OF THE INVENTION

The present disclosure relates to a method and an apparatus for adjusting installation flatness of a lens in real time.

BACKGROUND OF THE INVENTION

Resolution measurement of a digital camera is usually accomplished by capturing an ISO chart, printing or displaying the captured image, and then visually evaluating the image in a subjective way to obtain a visually measured resolution value or using a software measurement method consistent with the visual evaluation method to evaluate image to acquire the resolution value.

In the visual evaluation method by visual inspection, an ISO pattern is printed or magnified by a fixed factor to observe a spatial frequency at which wedge-shaped lines vary, and the spatial frequency is taken as the resolution. Although the visual evaluation method is simple, it has shortcomings of being liable to influence of individual differences, time and labor consuming, and limited by the displaying and printing devices. The software measurement method can obtain a result as good as the visual evaluation method and is not limited by the devices and the labor, so it has been widely used.

To clearly obtain the resolution data, conventionally a testing method based on the Modulation Transfer Function (MTF) is most commonly used. The MTF mainly measures the contrast $M=(I_{max}-I_{min})/(I_{max}+I_{min})$ to reflect the resolving power of human eyes, where $I_{max}$ and $I_{min}$ are the maximum value and the minimum value of illumination respectively. Additionally, the Spatial Frequency Response (SFR) measurement has become another means that is commonly used in recent years. The SFR measurement mainly measures the influence of increasing spatial frequency lines for a single image.

The visual evaluation method is simple to operate but is limited by the devices and consumes labor, so it is unsuitable for the wide automatic industrial production. The MTF-based measurement method (e.g., the HYRes software from Japan) has long been proved to be effective, but with the advent of digital cameras of the 10-million pixel scale, the capturing resolution has already exceeded the limits of USAF1951 and ISO12233, which makes the MTF-based measurement method unable to test such digital cameras. Meanwhile, the MTF-based measurement method is computation intensive, and does not allow for real-time dynamic processing. The SFR-based measurement method (e.g., the Imatest software from the U.S.) has a low cost and provides a good drawing effect, but it is complex to operate, demands higher skills of the testing personnel, and does not allow for real-time dynamic testing.

SUMMARY OF THE INVENTION

A primary objective of the present disclosure is to provide a method and an apparatus for adjusting installation flatness of a lens in real time, which can obtain a real-time resolution value of a camera in real time and automatically with the measurement result matching that of the visual evaluation method. The method and the apparatus for adjusting the installation flatness of the lens according to the present disclosure are flexibly adjustable and robust, and allow the installation angle of the optical axis of the camera lens to be adjusted relative to a camera photosensitive surface based on the real-time resolution value of the camera.

To solve the aforesaid technical problem, a technical solution adopted in the present disclosure is to provide a method for adjusting the installation flatness of a lens in real time, which comprises: acquiring an image of a testing chart captured by a camera in real time, wherein the image comprises at least two groups of testing charts regarding different positions of a camera photosensitive surface; pre-processing the image of the testing chart to obtain a plurality of groups of testing charts by separation; calculating and displaying, based on each group of testing charts, a real-time resolution value of the camera photosensitive surface to each group of testing charts in real time; and adjusting the installation angle of the optical axis of the camera lens relative to the camera photosensitive surface in real time based on the real-time resolution value of the camera photosensitive surface to each group of testing charts.

Each group of testing charts comprises at least one testing stripe set, each testing stripe set comprises a plurality of testing stripes spaced apart from each other, and the distances between the testing stripes change gradually in a direction perpendicular to the spacing direction of the testing stripes.

Each group of testing charts comprises a first testing stripe set and a second testing stripe set, the first testing stripe set comprises a plurality of first testing stripes spaced apart from each other in a first direction and extending in a second direction perpendicular to the first direction, with the distances between the first testing stripes varying gradually in the second direction; and the second testing stripe set comprises a plurality of second testing stripes spaced apart from each other in the second direction and extending in the first direction, with the distances between the second testing stripes varying gradually in the first direction.

The at least two groups of testing charts are five groups of testing charts, of which four groups correspond to four corners of the photosensitive surface of the camera and the other group corresponds to the center of the camera photosensitive surface.

The step of calculating and displaying, based on each group of testing charts, a real-time resolution value of the camera photosensitive surface to each group of testing charts comprises: sampling each group of testing charts by row or by column to obtain a plurality of stripe square-wave signals; performing Fourier transformation on the stripe square-wave signals to produce spectrum charts, where each stripe square-wave signal corresponds to a spectrum chart respectively; and calculating and displaying the real-time resolution value of the camera photosensitive surface to each group of testing charts based on the spectrum chart of each stripe square-wave signal.

The step of calculating and displaying the real-time resolution value of the camera photosensitive surface to each group of testing charts based on the spectrum chart of each stripe square-wave signal comprises: calculating an average frequency amplitude $A_{aver}$ and a characteristic frequency amplitude $A_t$ of each stripe square-wave signals based on the spectrum chart of each stripe square-wave signal; determining whether the characteristic frequency amplitude $A_t$ satisfies a significant condition according to the following formula: $A_t/A_{aver}$>Thres, wherein Thres is a preset threshold. If the characteristic frequency amplitude $A_t$ satisfies the significant condition, the resolution value corresponding to the stripe square-wave signal is the real-time resolution value of the camera photosensitive surface to the testing chart.

The method further comprises the following steps before the step of performing Fourier transformation on the stripe square-wave signals: removing the direct-current (DC) component of each of the stripe square-wave signals through a following operation: x'(k)=x(k)−mean(x(k)); wherein x(k) is the stripe square-wave signal before the DC component is removed, mean(x(k)) is the average value of the stripe square-wave signal before the DC component is removed, and x'(k) is the stripe square-wave signal after the DC component is removed.

The method further comprises the following steps before pre-processing the image: rotating the image of the testing chart captured by the camera according to the following formula:

$$\begin{cases} x_0 = x\cos\theta + y\sin\theta + m \\ y_0 = -x\sin\theta + y\cos\theta + n \end{cases},$$

wherein m=−0.5W cos θ−0.5H sin θ+0.5$W_0$, n=0.5W sin θ−0.5H cos θ+0.5$H_0$, $x_0$ and $y_0$ represent the horizontal coordinate and the vertical coordinate of a pixel point in the image respectively before the rotation, x and y represent the horizontal coordinate and the vertical coordinate of the pixel point in the image respectively after the rotation, $H_0$ and $W_0$ represent the height and the width of the testing charts in the image respectively before the rotation, H and W represent the height and the width of the testing charts in the image respectively after the rotation, and θ represents rotation angle.

The step of pre-processing the image comprises: performing gray processing on the image of the testing chart; performing morphological filtering on the gray processed image to obtain testing chart regions in different directions; and performing image binarization on the testing chart regions to obtain each group of testing charts by separation.

To solve the aforesaid technical problem, another technical solution adopted in the present disclosure is to provide an apparatus for adjusting the installation flatness of a lens in real time, which comprises a target, a processing system and a display device, wherein: the target is configured to present an image of a testing chart captured by a camera, and the image comprises at least two group of testing charts regarding different positions of a camera photosensitive surface; the processing system is configured to receive the image of the testing chart captured by the camera, pre-process the image of the testing chart to obtain a plurality of groups of testing charts by separation, and calculate a real-time resolution value of the camera photosensitive surface to each group of testing charts in real time based on each group of testing charts obtained by separation; and the display device is configured to receive the real-time resolution value of the camera photosensitive surface to each group of testing charts from the processing system and display the real-time resolution value so that a user adjusts the installation angle of the optical axis of the camera lens relative to the camera photosensitive surface in real time based on the real-time resolution value of the camera photosensitive surface to each group of testing charts.

Each group of testing charts comprises at least one testing stripe set, each testing stripe set comprises a plurality of testing stripes spaced apart from each other, and the distances between the testing stripes change gradually in a direction perpendicular to a spacing direction of the testing stripes.

Each group of testing charts comprises a first testing stripe set and a second testing stripe set, the first testing stripe set comprises a plurality of first testing stripes spaced apart from each other in a first direction and extending in a second direction perpendicular to the first direction, with the distances between the first testing stripes varying gradually in the second direction; and the second testing stripe set comprises a plurality of second testing stripes spaced apart from each other in the second direction and extending in the first direction, with the distances between the second testing stripes varying gradually in the first direction.

The at least two groups of testing charts are five groups of testing charts, of which four groups correspond to four corners of the photosensitive surface of the camera and the other group corresponds to the center of the camera photosensitive surface.

The processing system is specifically configured to sample each group of testing charts by row or by column to obtain a plurality of stripe square-wave signals, perform Fourier transformation on the stripe square-wave signals to produce spectrum charts, where each stripe square-wave signal corresponds to a spectrum chart respectively, and calculate the real-time resolution value of the camera photosensitive surface to each group of testing charts based on the spectrum chart of each stripe square-wave signal.

The processing system is specifically configured to calculate an average frequency amplitude $A_{aver}$ and a characteristic frequency amplitude $A_t$ of each stripe square-wave signal based on the spectrum chart of each stripe square-wave signal, and determine whether the characteristic frequency amplitude $A_t$ satisfies a significant condition according to the following formula: $A_t/A_{aver}$>Thres, wherein Thres is a preset threshold If the characteristic frequency amplitude $A_t$ satisfies the significant condition, the resolution value corresponding to the stripe square-wave signal is the real-time resolution value of the camera photosensitive surface to the testing chart.

Before performing Fourier transformation on the stripe square-wave signals, the processing system is further specifically configured to remove the DC component of each of the stripe square-wave signals through a following operation: x'(k)=x(k)−mean(x(k)); wherein x(k) the a stripe square-wave signal before the DC component is removed, mean(x(k)) is the average value of the stripe square-wave signal before the DC component is removed, and x'(k) is the stripe square-wave signal after the DC component is removed.

The processing system is further configured to rotate the image of the testing chart captured by the camera according to the following formula:

$$\begin{cases} x_0 = x\cos\theta + y\sin\theta + m \\ y_0 = -x\sin\theta + y\cos\theta + n \end{cases},$$

wherein m=−0.5W cos θ−0.5H sin θ+0.5$W_0$, n=0.5W sin θ−0.5H cos θ+0.5$H_0$, $x_0$ and $y_0$ represent the horizontal coordinate and the vertical coordinate of a pixel point in the image respectively before the rotation, x and y represent the horizontal coordinate and the vertical coordinate of the pixel point in the image respectively after the rotation, $H_0$ and $W_0$ represent the height and the width of the testing charts in the image respectively before the rotation, H and W represent the height and the width of the testing charts in the image respectively after the rotation, and θ represents rotation angle.

The processing system is further configured to perform gray processing on the image of testing charts, perform morphological filtering on the gray processed image to obtain testing chart regions in different directions, and perform image binarization on the testing chart regions to obtain each group of testing charts by separation.

The present disclosure has the following benefits: the present disclosure acquires an image of a testing chart captured by a camera in real time, where the image comprises at least two groups of testing charts regarding different positions of a camera photosensitive surface; pre-processes the image to obtain each group of testing charts by separation; calculates and displays, based on each group of testing charts, a real-time resolution value of the camera photosensitive surface to each group of testing charts in real time; and adjusts the installation angle of the optical axis of the camera lens relative to the camera photosensitive surface in real time based on the real-time resolution value of the camera photosensitive surface to each group of testing charts. In this way, a real-time resolution value of a camera can be obtained in real-time and automatically, and the installation angle of the optical axis of the camera relative to a camera photosensitive surface can be adjusted in real time based on the real-time resolution value of the camera, thus saving the manpower and physical resources. In addition, the measurement result thereof matches that of the visual evaluation method, and is flexibly adjustable and robust.

DETAILED DESCRIPTION OF THE INVENTION

Figure 1:
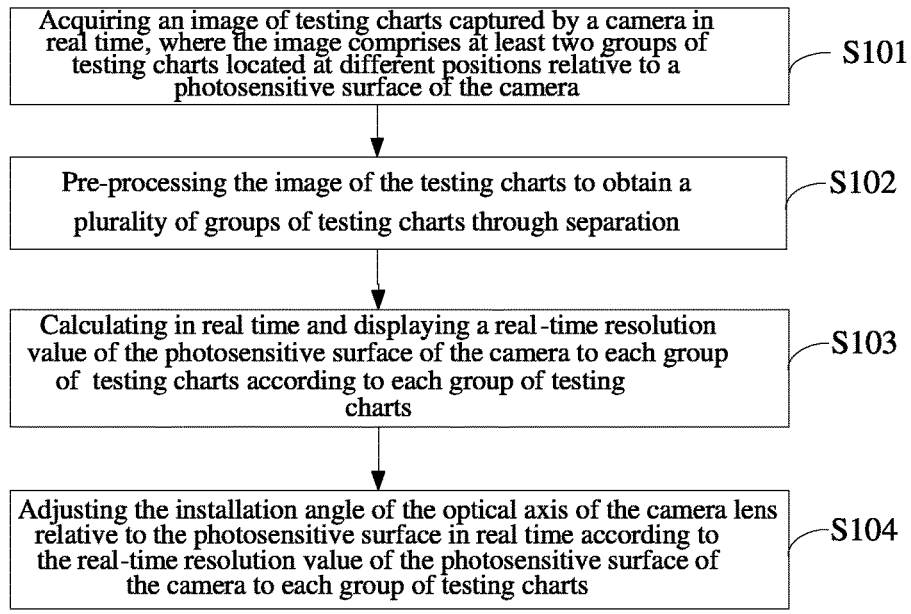
FIG. 1 is a flowchart illustrating a method for adjusting installation flatness of a lens in real time according to an embodiment of the present disclosure.

Referring to FIG. 1, FIG. 1 shows a flowchart illustrating a method for adjusting installation flatness of a lens in real time according to an embodiment of the present disclosure. This embodiment is described from the perspective of an apparatus for adjusting the installation flatness of a lens in real time. The method for adjusting the installation flatness of the lens in real time of this embodiment comprises:

S101: acquiring an image of a testing chart captured by a camera in real time, wherein the image comprises at least two groups of testing charts regarding different positions of a camera photosensitive surface.

Figure 4:
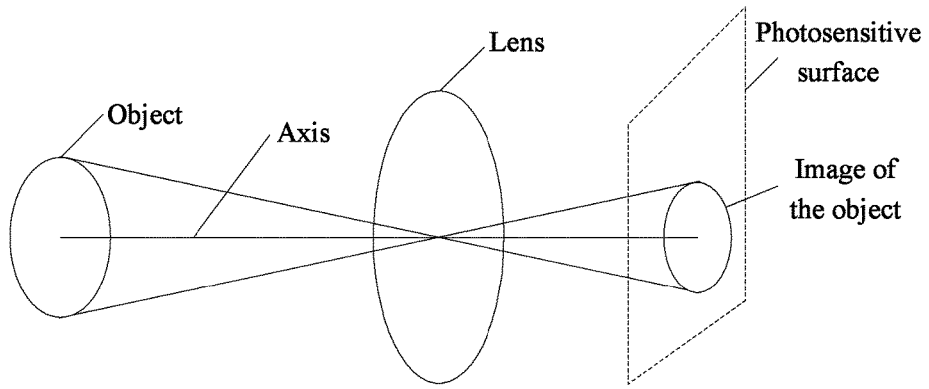
FIG. 4 is a schematic view illustrating the image-forming principles of a camera provided in an embodiment of the present disclosure.

Refer to FIG. 4, FIG. 4 shows a schematic view illustrating an imaging principle of a camera. Light rays coming from an object pass through a lens of a camera and then converge onto a film to form an inverted and downsized real image. The optical axis of the camera lens runs through the center points of the object, the lens, and the image of the object.

It should be noted that, during image capturing, testing charts that are captured should be kept to be as horizontal or vertical as possible so that the accuracy of the testing result is not affected.

Figure 5:
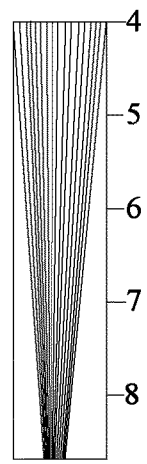
FIG. 5 is a schematic structural view of a testing stripe set provided in an embodiment of the present disclosure.

Each group of testing charts may comprise at least one testing stripe set, as shown in FIG. 5, FIG. 5 is a schematic structural view of a testing stripe set provided in an embodiment of the present disclosure. Each of the testing stripe sets comprises a plurality of testing stripes spaced apart from each other, with distances between the testing stripes varying gradually in a direction perpendicular to the spacing direction, such as increasing or decreasing gradually. Take the testing chart shown in FIG. 5 as an example. The spacing direction of the stripes is in a horizontal direction, the direction perpendicular to the spacing direction of the stripes is in a vertical direction. The distances between the stripes increase gradually from bottom to top in the vertical direction, and the distances between the stripes decrease gradually from top to bottom in the vertical direction. On the stripe testing set, resolution scale marks are also shown to represent resolution values corresponding to different positions on the testing stripe set respectively.

Figure 6:
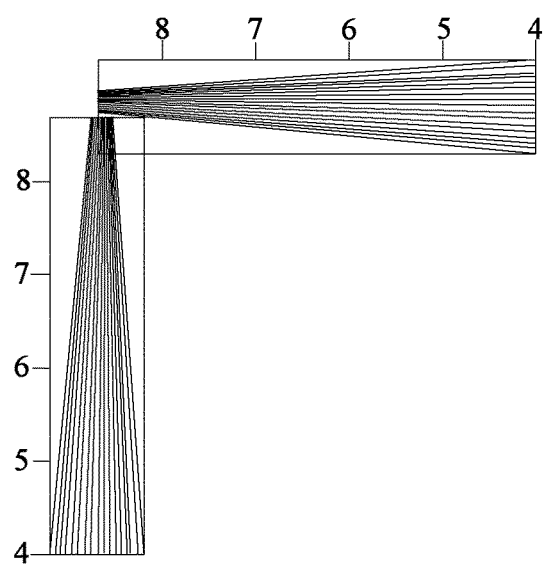
FIG. 6 is a schematic structural view of one group of testing charts provided in an embodiment of the present disclosure.

As a preferred implementation, each group of testing charts comprises a first testing stripe set and a second testing stripe set, as shown in FIG. 6. FIG. 6 is a schematic structural view of one group of testing charts provided in an embodiment of the present disclosure. The first testing stripe set comprises a plurality of first testing stripes spaced apart from each other in a first direction and extending in a second direction perpendicular to the first direction, with the distances between the first testing stripes varying gradually in the second direction, such as increasing or decreasing gradually. The second testing stripe set comprises a plurality of second testing stripes spaced apart from each other in the second direction and extending in the first direction, with the distances between the second testing stripes varying gradually in the first direction, such as increasing or decreasing gradually. The term "increasing or decreasing gradually" herein is only in a relative sense, and details thereof have been described above and will not be described again herein.

Figure 7:
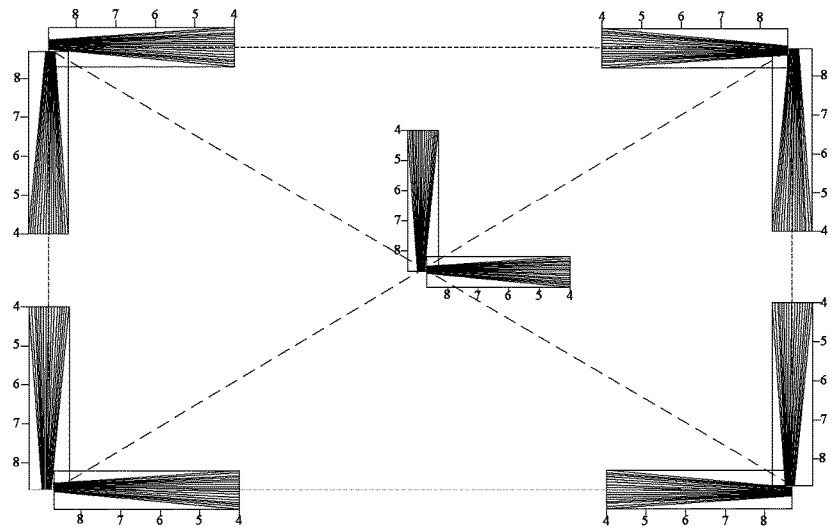
FIG. 7 is a schematic view illustrating relative positions of five groups of testing charts regarding a camera photosensitive surface provided in an embodiment of the present disclosure.

In a preferred embodiment, an image comprising five groups of testing charts is captured by a camera, as shown in FIG. 7. FIG. 7 is a schematic view illustrating relative positions of five groups of testing charts corresponding to a camera photosensitive surface provided in an embodiment of the present disclosure. Four of the five groups of testing charts correspond to four corners of the photosensitive surface of the camera and the other group of testing charts correspond to the center of the photosensitive surface of the camera.

S102: pre-processing the image of testing charts to obtain a plurality of groups of testing charts by separation.

The image of testing charts captured is pre-processed to obtain a plurality of groups of testing charts by separation.

The testing charts captured may not be kept to be horizontal or vertical due to device constraints or for other reasons, and this will affect the accuracy of the testing. In order to avoid this, in a preferred embodiment, the image of testing charts captured by the camera is rotated according to the following formula before the image is pre-processed so that the image can meet conditions:

$$\begin{cases} x_0 = x\cos\theta + y\sin\theta + m \\ y_0 = -x\sin\theta + y\cos\theta + n \end{cases},$$

Because the coordinates obtained through the mapping according to the aforesaid formula may present the problem of floating point coordinates, it is necessary to perform a bilinear interpolation optimization for the coordinates, that is:

$$m = -0.5W\cos\theta - 0.5H\sin\theta + 0.5W_0, n = 0.5W\sin\theta - 0.5H\cos\theta + 0.5H_0,$$

In the above formula, $x_0$ and $y_0$ denote the horizontal coordinate and the vertical coordinate of a pixel point in the image respectively before the rotation, x and y denote the horizontal coordinate and the vertical coordinate of the pixel point in the image respectively after the rotation, $H_0$ and $W_0$ denote the height and the width of a testing chart in the image respectively before the rotation, H and W denote the height and the width of the testing chart in the image respectively after the rotation, and θ denotes rotation angle.

Figure 2:
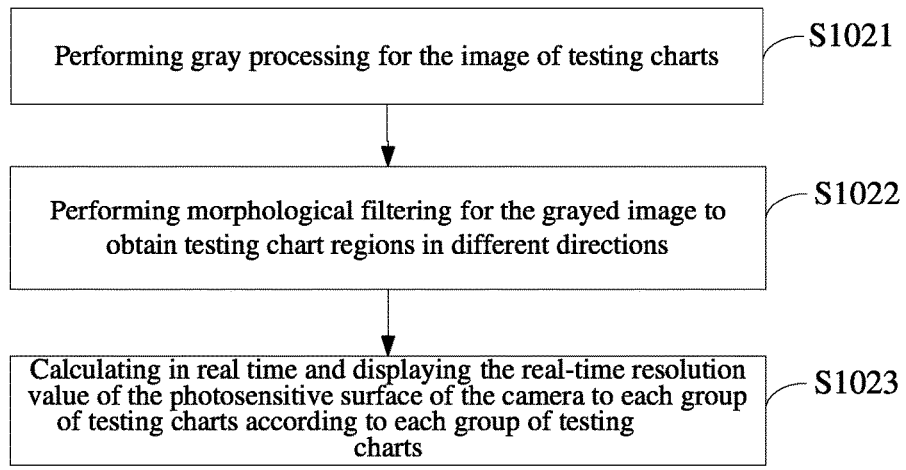
FIG. 2 is a flowchart illustrating a step of pre-processing an image of a testing chart provided in an embodiment of the present disclosure.

Please refer further to FIG. 2 for this embodiment. FIG. 2 is a flowchart illustrating a step of pre-processing an image. The step of pre-processing an image in this embodiment may comprise the following substeps of:

S1021: performing gray processing on the image of testing charts.

Gray processing is performed on the image of testing charts to obtain a gray matrix of the image. The colors may be classified into the black and white color and the chromatic colors. The black and white color refers to a color that comprises no chromatic color but black and white. In the RGB color model, the color (R,G,B) represents a black and white color if R=G=B, and the value of R=G=B is called a gray value, so the black and white color is also called a gray color. The chromatic colors and the gray colors can be transformed into each other and the process of transforming from a chromatic color into a gray color is called gray processing.

S1022: performing morphological filtering on the gray processed image to obtain testing chart regions in different directions.

Morphological filtering is performed on the gray processed image. The morphological method studies an image mainly based on set theory. The morphological operation is performed on an image set F by using different structural elements E to obtain a result set sequence $Y_i$. If F, $\{E_i\} \subset Z^2$, and $\{E_i\} = \{E_1, E_2 \ldots, E_n\}$ is a set having multiple structural elements, then:

Morphological erosion is defined as: F! $|E_i| = \cup_{i=1}^n$ F! $E_i$

Morphological dilation is defined as: F⊕$|E_i| = \cup_{i=1}^n$ F⊕$E_i$

Morphological opening operation is defined as: F∘$|E_i| = \cup_{i=1}^n$ F∘$E_i$

Morphological closing operation is defined as: F●$|E_i| = \cup_{i=1}^n$ F●$E_i$

Through the continuous interaction between F and $E_i$, the morphological filtering can not only filter out region of interest that we intend to obtain (i.e., stripe testing chart regions in different directions) but also eliminate stain interference block that we are not interested in so that the robustness of the overall system can be improved.

S1023: performing image binarization on the testing chart regions to obtain every group of testing charts by separation.

The image binarization is the process of setting the gray value of the pixel points in the image to be 0 or 255 so that the overall image can present a distinct black and white effect. The edges of the testing chart regions in different directions are detected through use of the classical edge detection algorithm so that every group of testing charts can be obtained by separation. So far, the image pre-processing operation is completed.

S103: calculating and displaying, based on each group of testing charts, a real-time resolution value of the camera photosensitive surface to each group of testing charts in real time.

The real-time resolution of the camera photosensitive surface to each group of testing charts is obtained by calculating based on each group of testing charts in real time, and then the real-time resolution obtained through the calculation is displayed.

Figure 3:
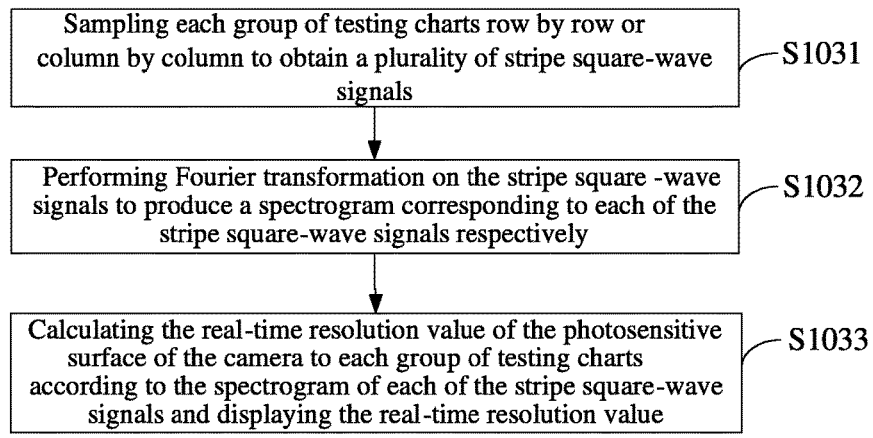
FIG. 3 is a flowchart illustrating a step of calculating and displaying, based on each group of testing charts, a real-time resolution value of the camera photosensitive surface to each group of testing charts provided in an embodiment of the present disclosure.

Refer to FIG. 3, FIG. 3 shows a flowchart diagram illustrating a step of calculating and displaying, based on each group of testing charts, a real-time resolution value of the camera photosensitive surface to each group of testing charts provided in an embodiment of the present disclosure, and the step may comprise the following substeps of:

S1031: sampling each group of testing charts by row or by column to obtain a plurality of stripe square-wave signals.

Each group of testing charts obtained by separation is sampled by row or by column with respect to the central symmetry axis of each group of testing charts so that a series of stripe square-wave signals having a fixed period can be obtained.

S1032: performing Fourier transformation on the stripe square-wave signals to produce spectrum charts, wherein each stripe square-wave signal corresponds to a spectrum chart respectively.

Fourier transformation are performed on the stripe square-wave signals that are obtained through the sampling to produce spectrum charts, where each stripe square-wave signal corresponds to a spectrum chart respectively.

Because numerous DC components exist in the stripe square-wave signals which can make the characteristic frequency amplitude $A_t$ in the spectrum chart unobvious, in a preferred implementation, the DC components in the stripe square-wave signals are removed first before the Fourier transformation are performed, and it is specifically performed as follows:

$$x'(k) = x(k) - \mathrm{mean}(x(k));$$

where, x(k) is a stripe square-wave signal before the DC component is removed, mean(x(k)) is the average value of the stripe square-wave signal before the DC component is removed, and x'(k) is the stripe square-wave signal after the DC component is removed.

X ($\omega$) is obtained by performing Fourier transformation on the stripe square-wave signal after the DC component therein are removed, and X ($\omega$)=FFT (x' (k)).

Figure 8:
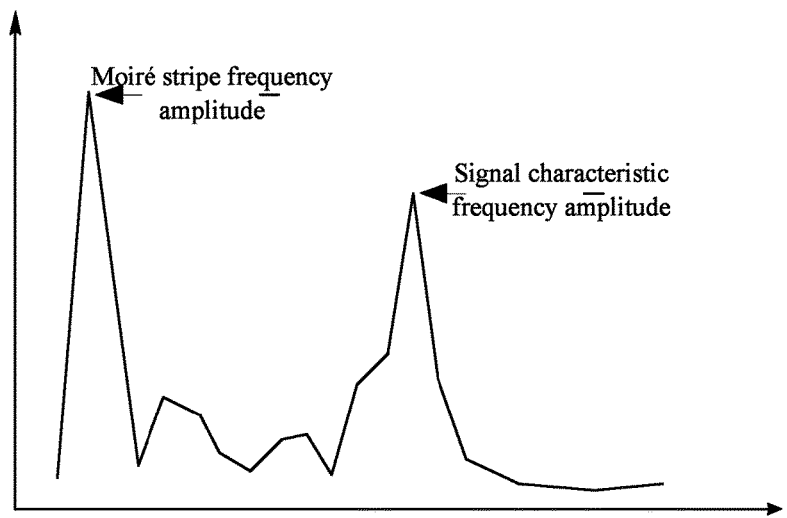
FIG. 8 is a schematic view illustrating the relationship between the signal characteristic frequency amplitude and the moiré stripe frequency amplitude of a spectrum chart corresponding to one of the sampled data provided in an embodiment of the present disclosure.
Figure 9:
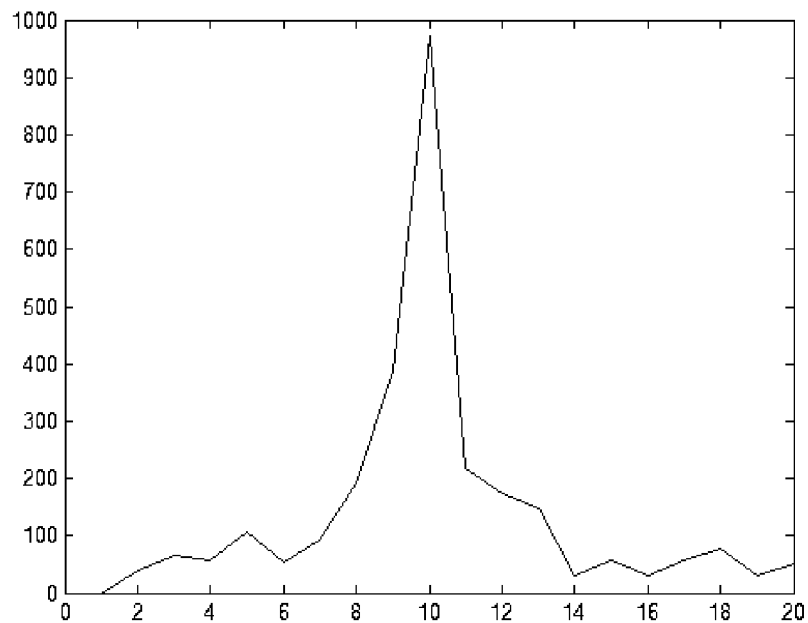
FIG. 9 is a spectrum chart corresponding to a sampling point corresponding to a resolution scale of 4 provided in an embodiment of the present disclosure.
Figure 10:
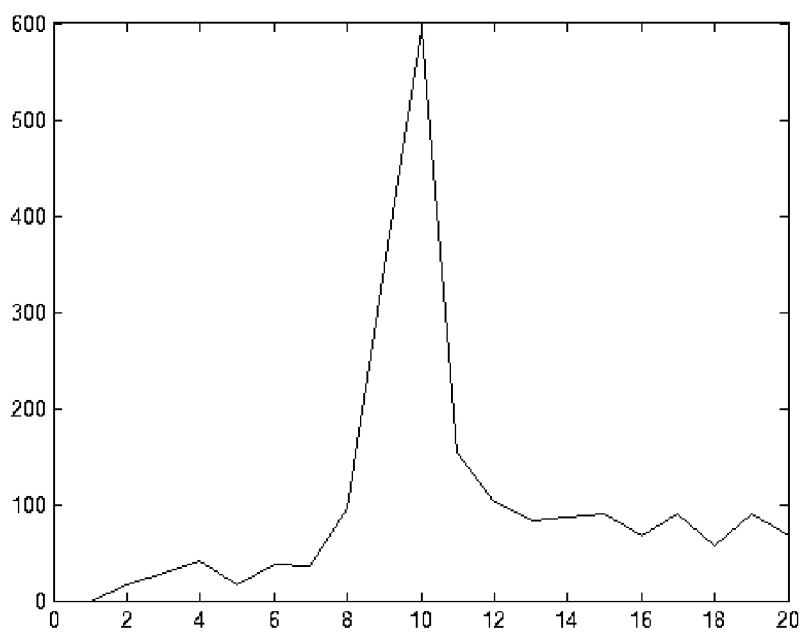
FIG. 10 is a spectrum chart corresponding to a sampling point corresponding to a resolution scale of 4.5 provided in an embodiment of the present disclosure.
Figure 11:
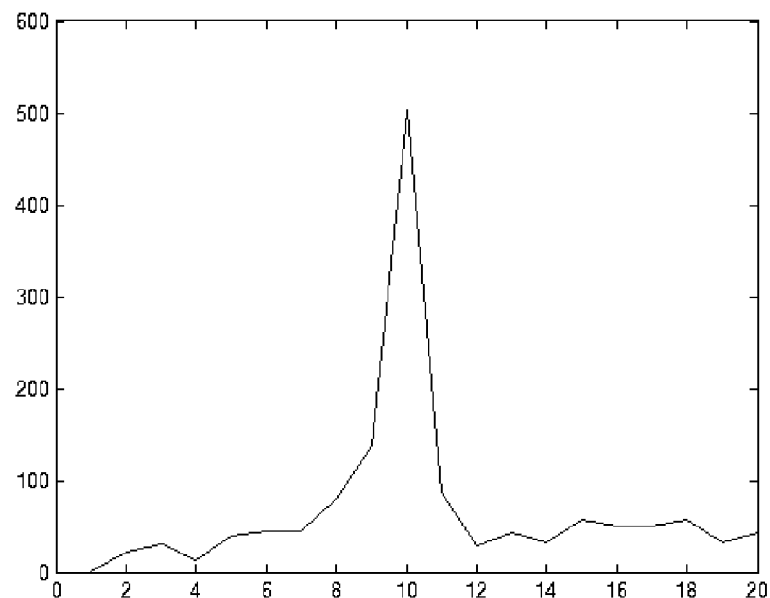
FIG. 11 is a spectrum chart corresponding to a sampling point corresponding to a resolution scale of 5 provided in an embodiment of the present disclosure.
Figure 12:
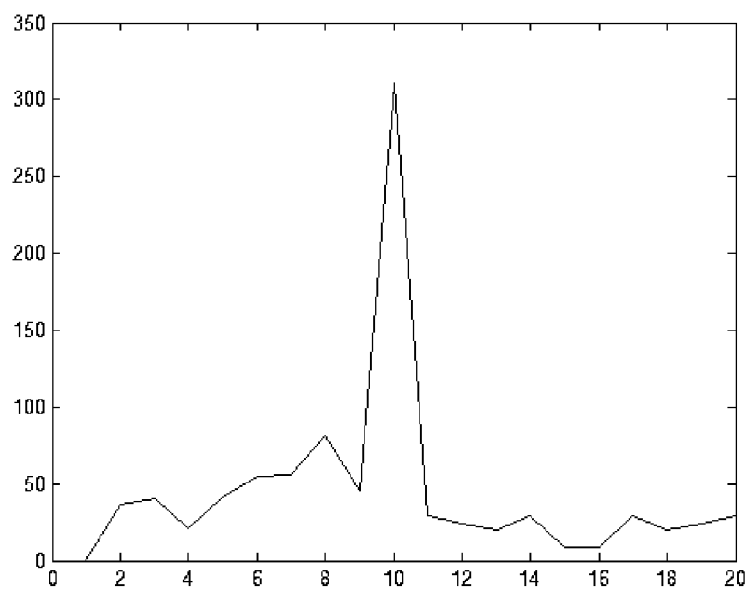
FIG. 12 is a spectrum chart corresponding to a sampling point corresponding to a resolution scale of 5.5 provided in an embodiment of the present disclosure.
Figure 13:
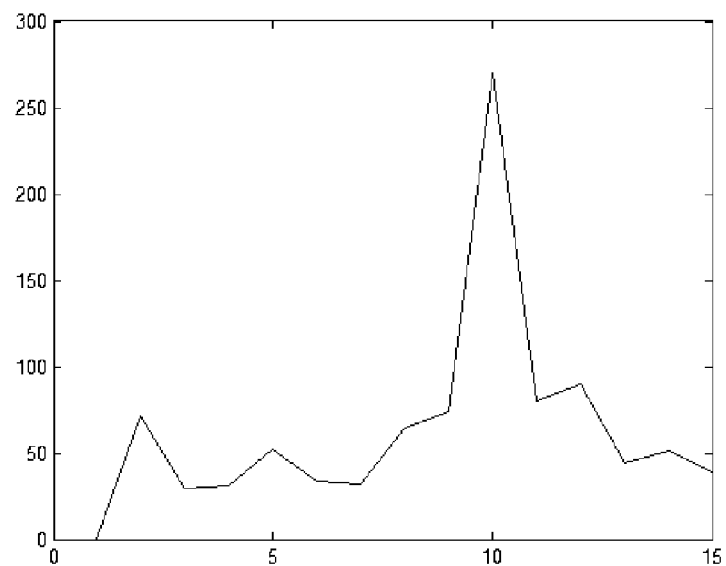
FIG. 13 is a spectrum chart corresponding to a sampling point corresponding to a resolution scale of 6 provided in an embodiment of the present disclosure.
Figure 14:
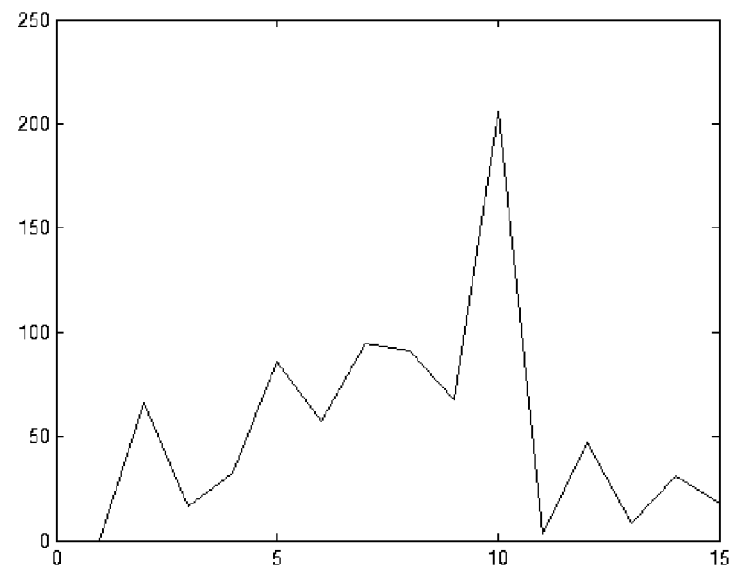
FIG. 14 is a spectrum chart corresponding to a sampling point corresponding to a resolution scale of 6.5 provided in an embodiment of the present disclosure.

Each sampled data corresponds to a spectrum chart, and the moiré stripe frequency amplitude $A_m$ and the signal characteristic frequency amplitude $A_t$ of each sampled data can be obtained respectively by analyzing each obtained spectrum chart. Refer to FIG. 8, FIG. 8 shows a schematic view illustrating the relationship between the signal characteristic frequency amplitude and the moiré stripe frequency amplitude of a spectrum chart corresponding to one of the sampled data provided in an embodiment of the present disclosure. In embodiments of the present disclosure, the spike amplitude of the signal characteristic frequency amplitude in the spectrum chart is taken as a signal characteristic frequency amplitude.

When the sampling is performed corresponding to different resolution scales on the testing charts respectively, the spectrum charts corresponding to sampling points that correspond to different scales are as shown in FIGS. 9-16. FIGS. 9-16 are spectrum charts corresponding to sampling points that sequentially correspond to resolution scales of 4, 4.5, 5, 5.5, 6, 6.5, 7, and 7.5 according to embodiments of the present disclosure.

S1033: calculating the real-time resolution value of the camera photosensitive surface to each group of testing charts based on the spectrum chart of each stripe square-wave signal and displaying the real-time resolution value.

There may be two possible implementations to calculate the real-time resolution value of the camera photosensitive surface to each group of testing charts based on the spectrum chart of each stripe square-wave signal.

The first implementation is as follows: obtaining the moiré stripe frequency amplitude and the signal characteristic frequency amplitude by analyzing the spectrum chart, and then determining whether the moiré stripe frequency amplitude is larger than the signal characteristic frequency amplitude. If the moiré stripe frequency amplitude is larger than the signal characteristic frequency amplitude, the resolution value corresponding to the stripe square-wave signal is the real-time resolution value of the camera photosensitive surface to the testing chart.

In a more preferred implementation, in order to characterize the visual evaluation that matches the visual evaluation by human eyes to conform to the vision disparity among different people, a threshold Thres is set. The spike amplitude of the signal characteristic frequency amplitude in the spectrum chart is taken as the signal characteristic frequency amplitude $A_t$, and the signal characteristic frequency amplitudes are summed and then averaged to get the average frequency amplitude $A_{aver}$. Whether the characteristic frequency amplitude $A_t$ satisfies a significant condition is determined according to the following formula: $A_t/A_{aver}$>Thres. If the characteristic frequency amplitude $A_t$ satisfies the significant condition, the resolution value corresponding to the stripe square-wave signal is the real-time resolution value of the camera photosensitive surface to the testing chart.

When different thresholds are set, the resolution values obtained through calculation may fluctuate as shown in the following chart:

|  | Thres | | | | | |
| --- | --- | --- | --- | --- | --- | --- |
|  | 1.3 | 1.4 | 1.5 | 1.6 | 1.7 | 1.8 |
| Resolution readings | 7.26 | 6.53 | 6.55 | 6.42 | 6.20 | 5.98 |

After the real-time resolution value of the camera photosensitive surface to each group of testing charts is obtained through calculation, the real-time resolution is displayed.

Many experiments were conducted to show that the real-time resolution obtained by testing through the above method is consistent with the result of the visual evaluation method.

S104: adjusting the installation angle of the optical axis of the camera lens relative to the photosensitive surface in real time based on the real-time resolution value of the camera photosensitive surface to each group of testing charts.

The adjusting apparatus of the camera adjusts the installation angle of the optical axis of the lens relative to the photosensitive surface in real time based on the displayed real-time resolution value of the camera photosensitive surface to each group of testing charts.

From the detailed description in the above embodiments, it can be understood that the method for adjusting the installation flatness of the lens in real time in the present disclosure acquires the image of a testing chart captured by the camera in real time, where the image comprises at least two groups of testing charts regarding different positions of the camera photosensitive surface; pre-processes the image of the testing chart to obtain a plurality of groups of testing charts by separation; calculates and displays, based on each group of testing charts, a real-time resolution value of the camera photosensitive surface to each group of testing charts in real time; and adjusts the installation angle of the optical axis of the lens relative to the camera photosensitive surface in real time based on the real-time resolution value of the camera photosensitive surface to each group of testing charts. In this way, real-time and dynamic measurement and fine adjustment can be performed to the image sensor and the lens of a camera that may not be installed flatly. The method gives a measurement result matching that of the visual evaluation method, and is flexibly adjustable and robust, so it can effectively overcome the defect of not performing the dynamic and real-time measurement of the conventional software measurement method. The method can save time and labor for camera manufacturers in adjustment of the image sensor and definition and can improve the production efficiency.

Figure 15:
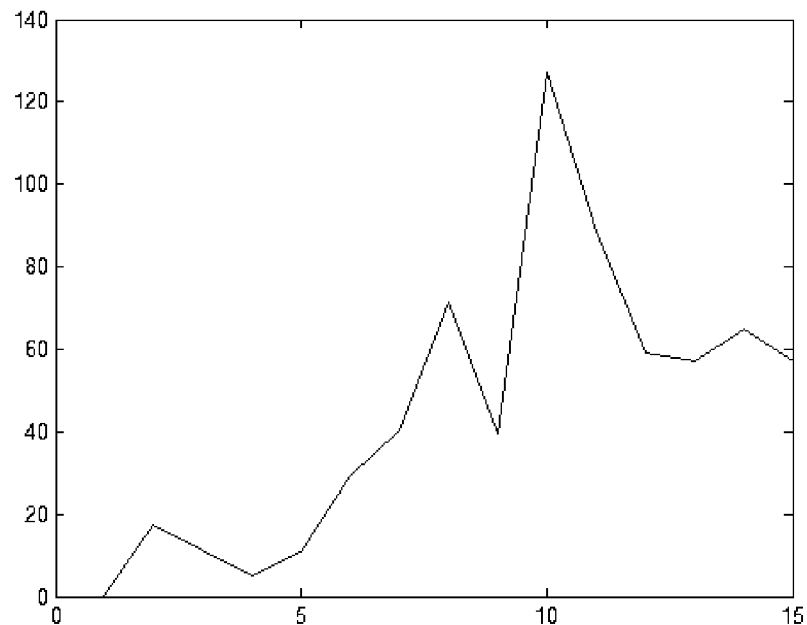
FIG. 15 is a spectrum chart corresponding to a sampling point corresponding to a resolution scale of 7 provided in an embodiment of the present disclosure.
Figure 16:
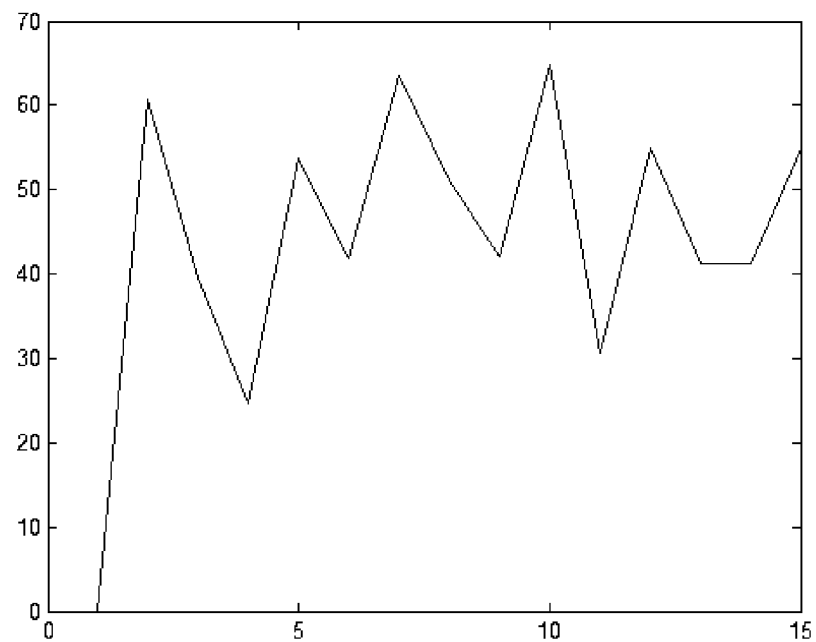
FIG. 16 is a spectrum chart corresponding to a sampling point corresponding to a resolution scale of 7.5 provided in an embodiment of the present disclosure.
Figure 17:
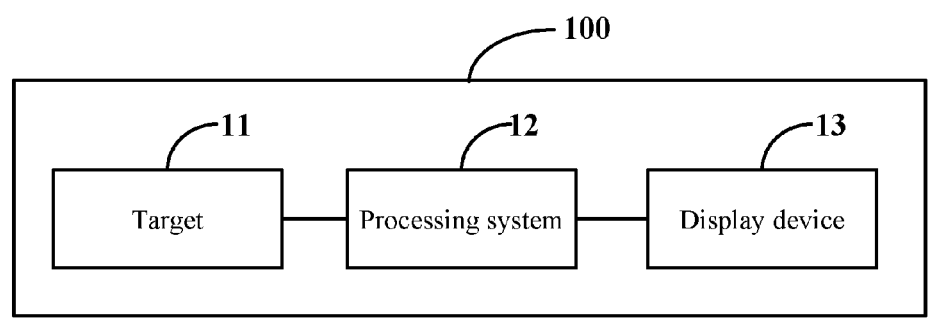
FIG. 17 is a schematic structural view of an apparatus for adjusting installation flatness of a leans in real time according to an embodiment of the present disclosure.

Refer to FIG. 15, FIG. 15 shows a schematic structural view of an apparatus for adjusting installation flatness of a lens in real time according to an embodiment of the present disclosure. The apparatus 100 for adjusting the installation flatness of the lens in real time in this embodiment comprises a target 11, a processing system 12, and a display device 13.

The target 11 is configured to present an image of a testing chart captured by a camera, and the image comprises at least two groups of testing charts regarding different positions of a camera photosensitive surface.

Firstly, the camera captures the image of a testing chart presented in the target 11 in real time. The image comprises at least two groups of testing charts regarding different positions of the camera photosensitive surface. It should be noted that, during the image capturing, the testing chart that is captured should be kept to be as horizontal or vertical as possible so that the accuracy of the testing result is not affected.

Each group of testing charts group may comprise at least one testing stripe set. Each of the testing stripe sets comprises a plurality of testing stripes apart from each other, and distances between the testing stripes vary changes gradually in a direction perpendicular to a spacing direction of the testing stripes, such as increasing or decreasing gradually. Take the testing chart shown in FIG. 5 as an example. The spacing direction of the stripes is in a horizontal direction, the direction perpendicular to the spacing direction of the stripes is in a vertical direction, the distances between the stripes increase gradually from bottom to top in the vertical direction, and the distances between the stripes decrease gradually from top to bottom in the vertical direction. Take the testing chart shown in FIG. 5 as an example. The spacing direction of the stripes is in a horizontal direction, the direction perpendicular to the spacing direction of the stripes is in a vertical direction, the distances between the stripes increase gradually from bottom to top in the vertical direction, and the distances between the stripes decrease gradually from top to bottom in the vertical direction. On the stripe testing set, resolution scale marks are also shown to represent resolution values corresponding to different positions on the testing stripe set respectively.

As a preferred implementation, each group of testing charts comprises a first testing stripe set and a second testing stripe set. The first testing stripe set comprises a plurality of first testing stripes spaced apart from each other in a first direction and extending in a second direction perpendicular to the first direction, with distances between the first testing stripes varying gradually in the second direction, such as increasing gradually or decreasing gradually. The second testing stripe set comprises a plurality of second testing stripes spaced apart from each other in the second direction and extending in the first direction, with distances between the second testing stripes varying gradually in the first direction, such as increasing or decreasing gradually.

In a preferred embodiment, the camera captures an image of five groups of testing charts. Four of the five groups of testing charts correspond to four corners of the camera photosensitive surface and the other group of testing chart corresponds to the center of the camera photosensitive surface.

The processing system 12 is configured to receive the image of a testing chart captured by the camera, pre-process the image of the testing chart to obtain a plurality of groups of testing charts by separation, and calculate, based on each group of testing charts obtained by separation, a real-time resolution value of the camera photosensitive surface to each group of testing charts in real time.

The testing chart captured may not be kept to be horizontal or vertical due to device constraints or for other reasons, and this can affect the accuracy of the testing. In order to avoid this, in a preferred embodiment, the image of the testing chart captured by the camera is rotated according to the following formula before the processing system 12 pre-processes the image so that the image can meet conditions:

$$\begin{cases} x_0 = x\cos\theta + y\sin\theta + m \\ y_0 = -x\sin\theta + y\cos\theta + n \end{cases},$$

Because the coordinates obtained through mapping according to the aforesaid formula may bring the problem of floating point coordinates, it is necessary to perform a bilinear interpolation optimization for the coordinates, that is:

$$m = -0.5W\cos\theta - 0.5H\sin\theta + 0.5W_0, n = 0.5W\sin\theta - 0.5H\cos\theta + 0.5H_0,$$

where, $x_0$ and $y_0$ represent the horizontal coordinate and the vertical coordinate of a pixel point in the image respectively before the rotation, x and y represent the horizontal coordinate and the vertical coordinate of the pixel point in the image respectively after the rotation, $H_0$ and $W_0$ represent the height and the width of the testing charts in the image respectively before the rotation, H and W represent the height and the width of the testing charts in the image respectively after the rotation, and θ represents the rotation angle.

The processing system 12 is specifically configured to perform gray processing for the image of testing chart, perform morphological filtering for the gray processed image to obtain testing chart regions in different directions, and perform image binarization for the testing chart regions to obtain each group of testing charts by separation.

Firstly, the processing system 12 performs gray processing for each frame image to acquire a gray matrix of the image. The colors may be classified into the black and white color and chromatic colors. The black and white color refers to a color that comprises no chromatic color but black white. In the RGB color model, the color (R,G,B) represents a black and white color if R=G=B, and the value of R=G=B is called a gray value, so the black and white color is also called a gray color. The chromatic colors and the gray colors can be transformed into each other and the process of transforming from a chromatic color into a gray color is called gray processing.

Morphological filtering is performed on the gray processed image to obtain testing chart regions in different directions.

The processing system 12 performs the morphological filtering on the gray processed image. The morphological method studies an image mainly based on the set theory. The morphological operation is performed on an image set F by using different structural elements $E_i$ to obtain a result set sequence $Y_i$. If F, $\{E_i\} \subset Z^2$, and $\{E_i\}=\{E_1, E_2 \ldots, E_n\}$ are a set of multi-structural elements, then:

Morphological erosion is defined as: $F! \ |E_i| = \cup_{i=1}^{n} F! \ E_i$
Morphological dilation is defined as: $F \oplus |E_i| = \cup_{i=1}^{n} F \oplus E_i$
Morphological opening operation is defined as:
$F \circ |E_i| = \cup_{i=1}^{n} F \circ E_i$ Morphological closing operation is defined as: $F \bullet |E_i| = \cup_{i=1}^{n} {}^n F \bullet E_i$ Through the continuous interaction between F and $E_i$, the morphological filtering can not only filter out region of interest that we intend to obtain (i.e., stripe testing chart regions in different directions) but also eliminate a stain interference block that we are not interested in so that the robustness of the overall system can be improved.

Finally, the processing system 12 performs image binarization on the testing chart regions that are obtained to obtain each group of testing charts by separation.

The image binarization is the process of setting the gray value of the pixel points in the image to be 0 or 255 so that the overall image can present a distinct black and white effect. The edges of the testing chart regions in different directions can be detected through use of the classical edge detection algorithm so that each group of testing charts can be obtained by separation. So far, the image processing operation is completed.

The processing system 12 is specifically configured to sample each group of testing charts by row or by column to obtain a plurality of stripe square-wave signals, perform Fourier transformation on the stripe square-wave signals to produce spectrum charts, where each stripe square-wave signal corresponds to a spectrum chart respectively, and calculate and display the real-time resolution value of the camera photosensitive surface to each group of testing charts based on the spectrum chart of each stripe square-wave signal.

The processing system 12 samples each group of testing charts obtained by separation by row or by column with respect to the central symmetry axis of each group of the testing charts so that a series of stripe square-wave signals having a fixed period can be obtained.

Fourier transformation are performed on the stripe square-wave signals that are obtained through the sampling to produce a spectrum chart corresponding to each stripe square-wave signal respectively.

Because numerous DC components exist in the stripe square-wave signals which can make the characteristic frequency amplitude $A_t$ in the spectrum chart unobvious, in a preferred implementation, the processing system 12 will first remove the DC components in the stripe square-wave signals through the following operations before performing the Fourier transformation, and it is specifically performed as follows:

$$x'(k) = x(k) - \text{mean}(x(k));$$

where, x(k) is the stripe square-wave signal before the DC component is removed, mean(x(k)) is the average value of the stripe square-wave signal before the DC component is removed, and x'(k) is the stripe square-wave signal after the DC component is removed.

$X(\omega)$ is obtained by performing Fourier transformation on the stripe square-wave signal after the DC component therein are removed, and $X(\omega) = \text{FFT}(x'(k))$.

Each sampled data corresponds to a spectrum chart, and the moiré stripe frequency amplitude $A_m$ and the signal characteristic frequency amplitude $A_t$ of each sampled data can be obtained respectively by analyzing each obtained spectrum chart.

Finally, the processing system 12 calculates a real-time resolution value of the camera photosensitive surface to each group of testing charts based on the spectrum chart of each stripe square-wave signal that is produced. The real-time resolution value of the camera photosensitive surface to each group of testing charts obtained through calculation is output to the display device 13 for display so that a user can adjust in real time the installation angle of the optical axis of the camera lens relative to the camera photosensitive surface based on the real-time resolution value.

There may be two possible implementations for the processing system 12 to calculate the real-time resolution value of the camera photosensitive surface to each group of testing charts based on the spectrum chart of each the stripe square-wave signal.

The first implementation is as follows: obtaining the moiré stripe frequency amplitude and the signal characteristic frequency amplitude by analyzing the spectrum chart, and determining whether the moiré stripe frequency amplitude is larger than the signal characteristic frequency amplitude. If the moiré stripe frequency amplitude is larger than the signal characteristic frequency amplitude, the resolution value corresponding to the stripe square-wave signal is the real-time resolution value of the camera photosensitive surface to the testing chart.

In a more preferred implementation, in order to characterize the visual evaluation that matches the visual evaluation by human eyes to conform to the vision disparity among different people, a threshold Thres is set, the spike amplitude of the signal characteristic frequency amplitude in the spectrum chart is taken as the signal characteristic frequency amplitude $A_t$, and the signal characteristic frequency amplitudes are summed and then averaged to get the average frequency amplitude $A_{aver}$. Whether the characteristic frequency amplitude $A_t$ satisfies a significant condition is determined according to the following formula: $A_t/A_{aver} > \text{Thres}$. If the characteristic frequency amplitude $A_t$ satisfies the significant condition, the resolution value corresponding to the stripe square-wave signal is the real-time resolution value of the camera photosensitive surface to the testing chart.

When different thresholds are set, the resolution values obtained through calculation may fluctuate as shown in the following chart:

|  | Thres | | | | | |
| --- | --- | --- | --- | --- | --- | --- |
|  | 1.3 | 1.4 | 1.5 | 1.6 | 1.7 | 1.8 |
| Resolution readings | 7.26 | 6.53 | 6.55 | 6.42 | 6.20 | 5.98 |

After the real-time resolution value of the camera photosensitive surface to each group of testing charts is obtained through calculation, the display device 13 will display the real-time resolution.

The user can adjust the installation angle of the optical axis of the camera lens relative to the camera photosensitive surface in real time based on the real-time resolution value of the camera photosensitive surface to each group of testing charts that is displayed by the display device 13.

The apparatus for adjusting the installation flatness of the lens in real time according to the above embodiments can execute the functions thereof as a standalone apparatus or by being embedded into a camera or some other device.

The apparatus for adjusting the installation flatness of the lens in real time according to this embodiment may execute the steps of the method for adjusting the installation flatness of the lens in real time shown in FIGS. 1-3. The division of individual functional elements is only illustrative, but is not intended to limit the protection scope of the present disclosure. Provided that the objectives of the present disclosure can be achieved, the individual functional elements of the apparatus for adjusting the installation flatness of the lens in real time may also be divided in other forms. For example, the elements may be combined into or integrated into another system, or some features may be omitted or may not be implemented.

From the detailed description in the above embodiments, it can be understood that the method and the apparatus for adjusting the installation flatness of the lens in real time according to the present disclosure acquire an image of a testing chart captured by a camera in real time, where the image comprises at least two groups of testing charts regarding different positions of a camera photosensitive surface; pre-process the image of the testing chart to obtain a plurality of groups of testing charts by separation; calculate and display, based on each group of testing charts, a real-time resolution value of the camera photosensitive surface to each group of testing charts in real time; and adjust the installation angle of the optical axis of the camera lens relative to the camera photosensitive surface in real time based on the real-time resolution value of the camera photosensitive surface to each group of testing charts. In this way, real-time and dynamic measurement and fine adjustment can be performed to the image sensor and the lens of a camera that may not be installed flatly. The method gives a measurement result matching that of the visual evaluation method, and is flexibly adjustable and robust, so it can effectively overcome the defect of not performing the dynamic and real-time measurement of the conventional software measurement method. The method can save time and labor for camera manufacturers in adjustment of the image sensor and the definition and can improve the production efficiency.

It should be understood that, in the several embodiments of the present disclosure, the system, the apparatus, and the method that are disclosed may be implemented in other manners. For example, the apparatus embodiment described above is only illustrative. As an example, the division of the modules and units only represents the division of logical functions, and there may be other division manners in practical implementations. For example, a plurality of units or components may be combined into or integrated into another system, or some features may be omitted or may not be implemented. Additionally, the coupling or direct coupling or communication connection that is shown and discussed may be achieved via same interfaces, devices or units, and may be in an electrical form, a mechanical form or in other forms.

The units described as separate components may be or may not be physically separate, and the components shown as units may be or may not be physical units, and may be co-located at a same place or distributed in a plurality of network units. A part of or all of the units may be selected depending on the actual need to achieve the objective of the present embodiment.

Furthermore, in the embodiments of the present disclosure, the various function units may be integrated into one processing unit, or each unit may be implemented as a separate physical unit, or two or more units may be integrated into a single unit. The integrated unit may be implemented either in the form of hardware or in the form of software function units.

If the integrated unit is to be implemented in the form of software function units and to be marketed or used as a standalone product, then it can be stored in a computer-readable storage medium. Based on this, the technical solutions of the present disclosure in nature or the part of the technical solutions that can contribute to the prior art or all or part of the technical solutions can be embodied as a software product. The computer software product is stored in a storage medium, and comprises a plurality of instructions which enable a computer device (e.g., a personal computer, a server, a network device or etc.) or a processor to execute all or some of the steps of the method described in the various embodiments of the present disclosure. The aforesaid storage medium includes various media that can store program codes such as a USB flash disk, a mobile hard disk, a read-only memory (ROM), a random access memory (RAM), a magnetic disk or an optical disk.

What described above are only the embodiments of the present disclosure, but are not intended to limit the scope of the present disclosure. Any equivalent structures or equivalent process variation that are made according to the specification and the attached drawings of the present disclosure, or any direct or indirect applications of the present disclosure in other related technical fields shall all be covered within the scope of the present disclosure.

The invention claimed is:

1. A method for adjusting the installation flatness of a lens in real time, comprising:
    acquiring an image comprising a plurality of testing charts captured by a camera in real time, wherein the image comprises at least two groups of testing charts corresponding to different positions of a camera photosensitive surface;
    pre-processing the image comprising the plurality of testing charts to separate the at least two groups of testing charts from the image,
        wherein the step of pre-processing the image includes:
            performing filtering on the image to obtain testing chart regions in different directions; and
            performing image binarization on the testing chart regions to separate the at least two groups of testing charts from the image;
    calculating and displaying, based on each group of testing charts separated from the image, a real-time resolution value associated with the camera photosensitive surface for each group of testing charts in real time; and
    adjusting the installation angle of the optical axis of the camera lens relative to the photosensitive surface in real time based on at least one of the real-time resolution values associated with the camera photosensitive surface for each group of testing charts.

2. The method of claim 1, wherein each group of testing charts comprises at least one testing stripe set, each testing stripe set comprises a plurality of testing stripes spaced apart from each other, and the distances between the testing stripes increase or decrease gradually in a direction perpendicular to the spacing direction of the testing stripes.

3. The method of claim 1,
    wherein each group of testing charts comprises a first testing stripe set and a second testing stripe set;
    wherein the first testing stripe set comprises a plurality of first testing stripes spaced apart from each other in a first direction and extending in a second direction perpendicular to the first direction, with the distances between the first testing stripes increasing or decreasing gradually in the second direction; and
    wherein the second testing stripe set comprises a plurality of second testing stripes spaced apart from each other in the second direction and extending in the first direction, with the distances between the second testing stripes increasing or decreasing gradually in the first direction.

4. The method of claim 1, wherein the at least two groups of testing charts comprises five groups of testing charts, wherein four groups of testing charts of the five groups of testing charts correspond to four corners of the camera photosensitive surface and a fifth group of testing charts of the five groups of testing charts corresponds to the center of the camera photosensitive surface.

5. The method of claim 1, wherein the step of calculating and displaying, based on each group of testing charts separated from the image, the real-time resolution value associated with the camera photosensitive surface for each group of testing charts in real time comprises:
sampling each group of testing charts by row or by column to obtain a plurality of stripe square-wave signals, wherein each group of testing charts is associated with at least one stripe square-wave signal;
performing Fourier transformation on the plurality of stripe square-wave signals to produce spectrum charts, wherein each stripe square-wave signal corresponds to a respective spectrum chart of the plurality of spectrum charts; and
calculating and displaying the real-time resolution value associated with the camera photosensitive surface for each group of testing charts based on the spectrum chart of each stripe square-wave signal.

6. The method of claim 5, wherein the step of calculating the real-time resolution value associated with the camera photosensitive surface for each group of testing charts based on the spectrum chart of each stripe square-wave signal comprises:
calculating an average frequency amplitude $A_{aver}$ and a characteristic frequency amplitude $A_t$ of each stripe square-wave signal based on the spectrum chart of the stripe square-wave signal;
determining whether the characteristic frequency amplitude $A_t$ of each stripe square-wave signal satisfies a condition based on the following formula:

$$A_t / A_{aver} > \text{Thres}$$

wherein Thres is a preset threshold; and
for each group of testing charts, determining a resolution value corresponding to the associated stripe square-wave signal to be the real-time resolution value associated with the camera photosensitive surface for the group of testing charts if the characteristic frequency amplitude $A_t$ of the associated stripe square-wave signal satisfies the condition.

7. The method of claim 5, further comprising:
before the step of performing Fourier transformation on the plurality of stripe square-wave signals, removing a direct-current (DC) component of each stripe square-wave signal through the following operation:

$$x'(k) = x(k) - \text{mean}(x(k));$$

wherein $x(k)$ is the stripe square-wave signal before the DC component is removed, mean($x(k)$) is the average value of the stripe square-wave signal before the DC component is removed, and $x'(k)$ is the stripe square-wave signal after the DC component is removed.

8. The method of claim 1, further comprising:
before pre-processing the image, rotating the image comprising the plurality of testing charts captured by the camera according to the following formula:

$$\begin{cases} x_0 = x\cos\theta + y\sin\theta + m \\ y_0 = -x\sin\theta + y\cos\theta + n \end{cases},$$

wherein, $m = -0.5W \cos\theta - 0.5H \sin\theta + 0.5W_0$,
$n = 0.5W \sin\theta - 0.5H \cos\theta + 0.5H_0$,
$x_0$ and $y_0$ represent the horizontal coordinate and the vertical coordinate of a pixel point in the image respectively before the rotation,
x and y represent the horizontal coordinate and the vertical coordinate of the pixel point in the image respectively after the rotation,
$H_0$ and $W_0$ represent the height and the width of at least one testing chart of the plurality of testing charts in the image respectively before the rotation,
H and W represent the height and the width of the at least one testing chart in the image after respectively after the rotation, and
θ represents rotation angle.

9. The method of claim 1, wherein the step of pre-processing the image further comprises:
performing gray processing on the image comprising the plurality of testing charts; and
performing morphological filtering on the gray processed image to obtain the testing chart regions in different directions.

10. An apparatus for adjusting the installation flatness of a lens in real time, the apparatus comprising:
a target;
a processing system; and
a display device,
wherein the target is configured to present at least two groups of testing charts corresponding to different positions of a camera photosensitive surface,
wherein the processing system is configured to:
receive an image comprising the at least two groups of testing charts captured by the camera,
pre-process the image comprising the at least two groups of testing charts to separate the at least two groups of testing charts from the image, the processing system being further configured to:
perform filtering on the image to obtain testing chart regions in different directions: and
perform image binarization on the testing chart regions to separate the at least two groups of testing charts from the image, and
calculate a real-time resolution value associated with the camera photosensitive surface for each group of testing charts in real time based on each group of testing charts separated from the image, and
wherein the display device is configured to:
receive the real-time resolution value associated with the camera photosensitive surface for each group of testing charts from the processing system, and
display the real-time resolution value for each group of testing charts, so that a user adjusts an installation angle of an optical axis of the lens relative to the camera photosensitive surface in real time based on the real-time resolution value associated with the camera photosensitive surface of the camera for each group of testing charts.

11. The apparatus of claim 10, wherein each group of testing charts comprises at least one testing stripe set, each testing stripe set comprises a plurality of testing stripes spaced apart from each other, and the distances between the testing stripes change gradually in a direction perpendicular to a spacing direction of the testing stripes.

12. The apparatus of claim 10,
wherein each group of testing charts comprises a first testing stripe set and a second testing stripe set;
wherein the first testing stripe set comprises a plurality of first testing stripes spaced apart from each other in a first direction and extending in a second direction perpendicular to the first direction, with the distances between the first testing stripes varying gradually in the second direction; and
wherein the second testing stripe set comprises a plurality of second testing stripes spaced apart from each other in the second direction and extending in the first direction, with the distances between the second testing stripes varying gradually in the first direction.

13. The apparatus of claim 10, wherein the at least two groups of testing charts comprises five groups of testing charts, wherein four groups of testing charts of the five groups of testing charts correspond to four corners of the camera photosensitive surface and a fifth group of testing charts of the five groups of testing charts corresponds to the center of the camera photosensitive surface.

14. The apparatus of claim 10, wherein the processing system is configured to:
sample each group of testing charts by row or by column to obtain a plurality of stripe square-wave signals, wherein each group of testing charts is associated with at least one stripe square-wave signal;
perform Fourier transformation on the plurality of stripe square-wave signals to produce spectrum charts, wherein each stripe square-wave signal corresponds to a respective spectrum chart of the plurality of spectrum charts; and
calculate the real-time resolution value associated with the camera photosensitive surface for each group of testing charts based on the spectrum chart of each stripe square-wave signal.

15. The apparatus of claim 14, wherein the processing system is configured to:
calculate an average frequency amplitude $A_{aver}$ and a characteristic frequency amplitude $A_t$ of each stripe square-wave signal based on the spectrum chart of the stripe square-wave signal;
determine whether the characteristic frequency amplitude $A_t$ of each stripe square-wave signal satisfies a condition according to the following formula:

$A_t / A_{aver} >$ Thres wherein Thres is a preset threshold; and
for each group of testing charts, determining a resolution value corresponding to the associated stripe square-wave signal to be the real-time resolution value associated with the camera photosensitive surface for the group of testing charts if the characteristic frequency amplitude $A_t$ of the associated stripe square-wave signal satisfies the condition.

16. The apparatus of claim 14, wherein the processing system is configured to:
before performing Fourier transformation on the plurality of stripe square-wave signals, remove a direct-current (DC) component of each stripe square-wave signal through the following operation:

$x'(k)=x(k)-\text{mean}(x(k))$;

wherein $x(k)$ is the stripe square-wave signal before the DC component is removed, $\text{mean}(x(k))$ is the average value of the stripe square-wave signal before the DC component is removed, and $x'(k)$ is the stripe square-wave signal after the DC component is removed.

17. The apparatus of claim 10, wherein the processing system is configured to rotate the image comprising the at least two groups of testing charts captured by the camera according to the following formula:

$$\begin{cases} x_0 = x\cos\theta + y\sin\theta + m \\ y_0 = -x\sin\theta + y\cos\theta + n \end{cases},$$

where, m=−0.5W cos θ−0.5H sin θ+0.5$W_0$,
n=0.5W sin θ−0.5H cos θ+0,5$H_0$ ,
$x_0$ and $y_0$ represent the horizontal coordinate and the vertical coordinate of a pixel point in the image respectively before the rotation,
x and y represent the horizontal coordinate and the vertical coordinate of the pixel point in the image respectively after the rotation,
$H_0$ and $W_0$ represent the height and the width of at least one testing chart of the plurality of testing charts in the image respectively before the rotation,
H and W represent the height and the width of the at least one testing chart in the image respectively after the rotation, and
θ represents rotation angle.

18. The apparatus of claim 10, wherein the processing system is further configured to:
perform gray processing on the image comprising the at least two groups of testing charts; and
perform morphological filtering on the gray processed image to obtain the testing chart regions in different directions.

19. The method of claim 1, wherein each group of testing charts in the image comprises more than one testing chart.

20. The apparatus of claim 10, wherein each group of testing charts presented by the target comprises more than one testing chart.

* * * * *